United States Patent
Rief et al.

(10) Patent No.: US 6,289,918 B1
(45) Date of Patent: *Sep. 18, 2001

(54) AUTOMATIC LOCKING BYPASS VALVE FOR LIQUID SUCTION SYSTEMS

(75) Inventors: Dieter J. Rief, Santa Rosa, CA (US); Hans Raines Schlitzer, Krugersdorp (ZA)

(73) Assignee: Poolvergnuegen, Santa Rosa, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/327,913

(22) Filed: Jun. 8, 1999

(51) Int. Cl.[7] ............................................. F16K 17/08
(52) U.S. Cl. .................... 137/114; 269/467; 269/508; 269/907
(58) Field of Search .................... 137/114, 269, 137/467, 508, 907

(56) References Cited

U.S. PATENT DOCUMENTS

| | | | |
|---|---|---|---|
| 4,570,660 | * 2/1986 | Chauvier | ............... 137/114 |
| 4,643,217 | * 2/1987 | Frentzel | ............... 137/907 X |
| 4,719,937 | * 1/1988 | Roche et al. | ............... 137/114 |
| 5,704,390 | * 1/1998 | Leon | ............... 137/508 X |

\* cited by examiner

Primary Examiner—Stephen M. Hepperle
(74) Attorney, Agent, or Firm—Jansson, Shupe & Munger Ltd.

(57) ABSTRACT

An automatically-locking bypass valve (10) of the type including a valve body (12), an inner member (11) in sliding engagement with the valve body (12) and having a bypass opening (48), the valve body (12) and inner member (11) having first and second vacuum-reactive surfaces (18a and 18b respectively), and a spring (60) between the valve body (12) and the inner member (11) against which the vacuum-reactive surfaces (18a and 18b respectively) move axially relative to each other. The valve body (12) has a guide (26) and the inner member (11) has a guide-follower (50) which is (a) slidably engaged with the guide (26) in one rotational alignment with the valve body (12) in a normal operating range of relative axial positions of the valve body (12) and inner member (11) and (b) out of sliding engagement with the guide (26) beyond such normal operating range. The spring (60) is in rotational tension such that it rotates the valve body (12) into a locked bypass position with respect to the inner member (11) when the guide (26) and guide-follower (50) are out of sliding engagement.

20 Claims, 3 Drawing Sheets

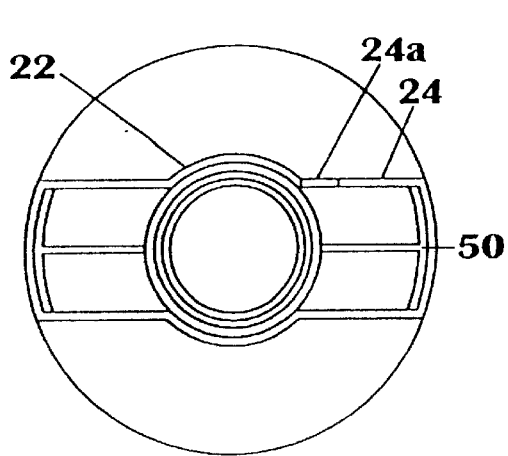
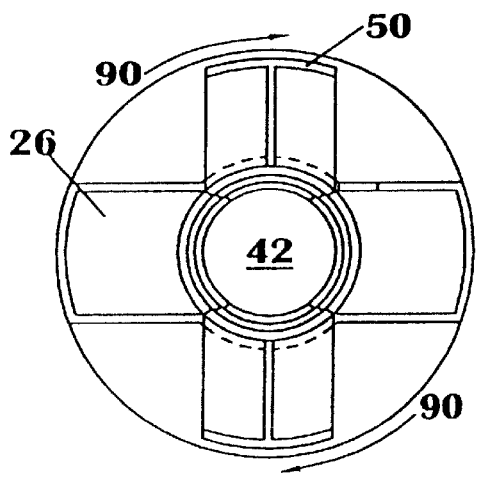
FIG. 1a      FIG. 2a
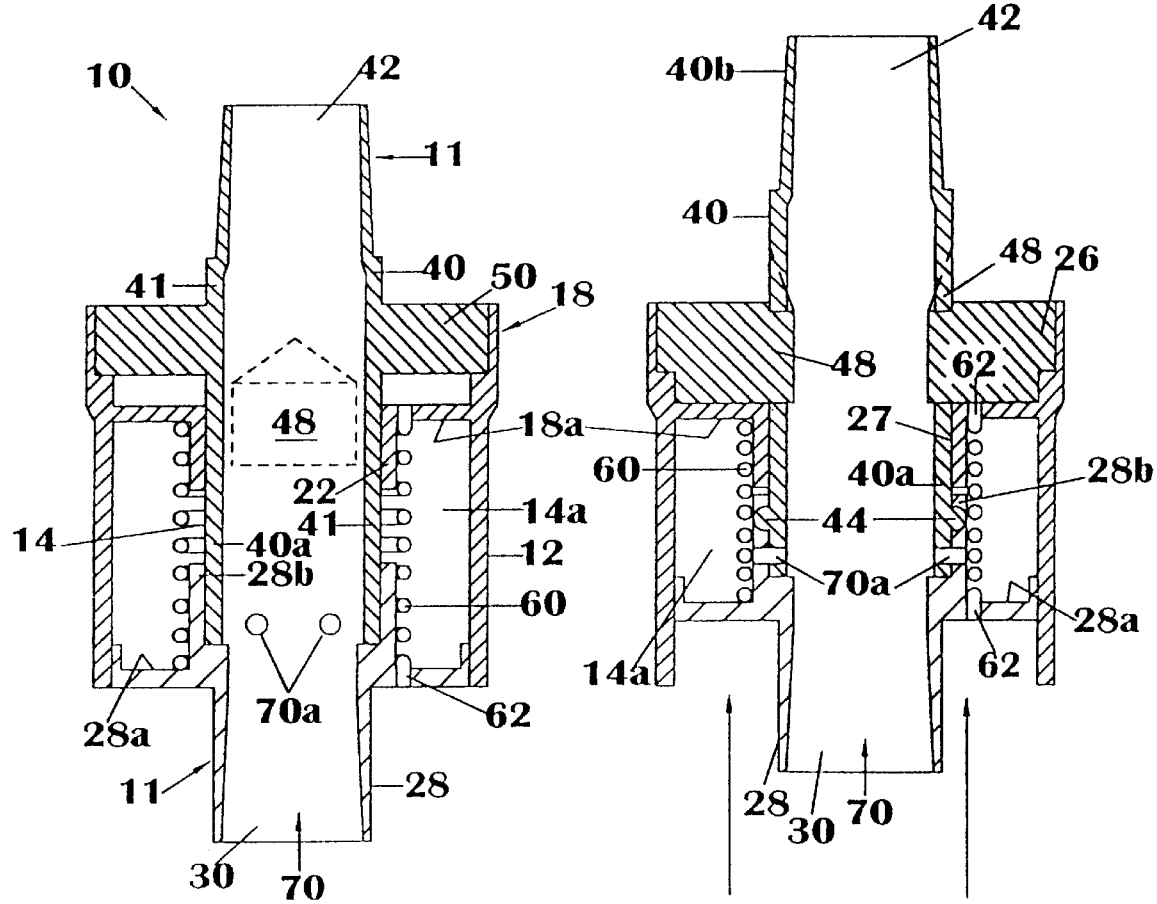
FIG. 1b      FIG. 2b

AUTOMATIC LOCKING BYPASS VALVE FOR LIQUID SUCTION SYSTEMS

RELATED APPLICATIONS

1. Field of the Invention

The invention is related generally to bypass valves for swimming pool suction cleaning systems.

2. Background of the Invention

Liquid suction systems are employed in a variety of settings and for a variety of purposes. One notable application is in automatic pool cleaning systems and main drains. When liquid suction lines become obstructed with debris, damage to the lines and equipment may result if the excessive vacuum pressures are not quickly released. Furthermore, the risk of bodily injury exists if a vacuum or suction device accidentally comes into contact with a person.

An example of a prior art valve with bypass features is disclosed in U.S. Pat. No. 4,570,660 (Chauvier). The '660 patent discloses a vacuum sleeve valve for controlling the flow of water to a filter of a swimming pool. In use, when flow is obstructed upstream of the valve, the vacuum chamber collapses and opens an auxiliary opening to allow bypass. When the obstruction has been removed, the valve automatically returns to the operational position. However, if the obstruction (whether or not a matter of urgent concern) remains, the system will continue to operate in a compromised mode, which may involve unwanted application of vacuum pressure, rather than end any unwanted application of vacuum pressure until the obstruction can be removed. Furthermore, with the system of the '660 patent, obstruction removal can be impeded by the immediate resumption of suction pressure during removal attempts, unless the entire system has been shut down.

The prior art fails to disclose or suggest a bypass valve which, if a substantial blockage happens to occur, automatically ends application of upstream suction pressure without the need to shut down the entire system. The prior art fails to disclose or suggest a bypass valve which allows removal of a substantial obstruction without the reimposition of suction pressure during removal. Likewise, the prior art fails to teach or suggest such a valve progressively open and automatically reset over a predetermined normal bypass-operating range, while also solving the above-noted problems.

OBJECTS OF THE INVENTION

It is an object of this invention to provide an improved bypass valve overcoming some of the problems and shortcomings of the prior art.

It is an object of this invention to provide a bypass valve which automatically locks in the open bypass position when vacuum pressure exceeds a normal bypass-operating range of vacuum pressure.

It is a further object of this invention to provide a bypass valve which can automatically lock in the open bypass position and which can progressively open and automatically reset over a normal bypass-operating range of vacuum pressures.

Another object of the invention is to provide a bypass valve which, when in the open and locked position, requires manual resetting prior to resuming normal operation.

Still another object of the invention is to provide a bypass valve which allows full system vacuum pressure to be bypassed and which allows customization of bypass flow to accommodate particular vacuum system parameters.

Still another object of the invention is to provide a bypass valve which is simple in construction and easily maintained.

These and other objects of the invention will be apparent from the following descriptions and from the drawings.

SUMMARY OF THE INVENTION

This invention is an improved bypass valve for use in liquid suction systems. The bypass valve is of the type including a valve body defining a chamber with a first vacuum-reactive surface and a bypass-blocking wall, an inner member which is in sliding engagement with the valve body and has a bypass opening and a second vacuum-reactive surface in the chamber and opposed to the first vacuum-reactive surface, and a spring between the valve body and the inner member against which the vacuum-reactive surfaces move axially relative to each other. The invention is an automatically locking bypass valve which overcomes some of the problems and shortcoming of the prior art.

In the improved bypass valve, the valve body has a guide and the inner member has a guide-follower which is (a) slidably engaged with the guide in one rotational alignment with the valve body in a normal operating range of relative axial positions of the inner member and valve body and (b) out of sliding engagement with the guide beyond such normal operating range of relative axial positions. The spring is held in rotational tension such that it rotates the valve body into a locked bypass position with respect to the inner member when the guide and guide-follower are out of sliding engagement.

More specifically, the bypass valve of this invention includes: (1) a valve body defining a chamber and having an outlet end structure forming a first spring-abutment, a first vacuum-reactive surface, a guide channel, and a bypass-blocking wall; (2) an inner assembly in sliding engagement with the valve body and forming an axial passageway therethrough, the inner assembly including (2a) an upstream member having a second spring-abutment facing the first spring-abutment and a second vacuum-reactive surface in the chamber and opposed to the first vacuum-reactive surface, and (2b) a downstream member fixed to the upstream member and having a bypass opening and a guide-follower arm. The guide-follower arm is slidably engaged with the guide channel in one rotational alignment with the valve body in a normal operating range of axial positions with respect thereto; the guide-follower arm is out of sliding engagement with the guide beyond such normal operating range. The bypass valve includes a spring in axial compression and rotational tension between the first and second spring-abutments. The spring is compressible by vacuum force on the vacuum-reactive surfaces to axially move the valve body with respect to the inner member. The spring rotates the valve body into a locked bypass position when the guide channel and guide-follower arm are out of sliding engagement. This feature alerts users of an obstruction in the line and allows investigation and corrective action to be taken without the possibility of the system resetting itself prior to completion of the investigation and/or corrective action.

In preferred embodiments, the outlet end structure (a) terminates axially inwardly in a sleeve having an inward cylindrical sleeve wall which forms the bypass-blocking wall, and (b) forms at least one radially-extending guide channel, the guide channel bounded by a sidewall joining the sleeve wall and terminating in a downstream edge; and the downstream member includes (c) a cylindrical tube portion received in mating fashion within the sleeve, the tube portion forming part of the axial passageway and defining the bypass opening, and (d) a guide-follower arm extending radially from the tube portion into the guide channel. Such embodiments preferably include a pair of the guide-follower arms extending in radially-opposite directions and a pair of the guide channels each receiving one of the guide-follower arms. The guide-follower arms may be painted red or have other indicia so a user can readily observe the relative axial positions of the valve body and inner member to ascertain changes in system vacuum pressures.

In certain preferred embodiments, the outlet end structure includes a stop engageable by the guide-follower arm to limit rotation of the valve body when the guide-follower arm is out of sliding engagement with the guide channel. Most preferably, the stop is an axially-extending portion of the guide channel sidewall.

In highly preferred embodiments, the tube portion of the downstream member and the valve body are substantially concentric and form an annular sub-chamber therebetween terminating upstream and downstream in the vacuum-reactive surfaces, such sub-chamber being in fluid communication with the axial passageway. The tube portion has an upstream end portion, and the upstream member has a cylindrical downstream end portion sized for mating engagement with the upstream end portion. The upstream and downstream end portions have slot-and-nub configurations for detachable locking engagement of the upstream and downstream members. Preferably, the slot-and-nub configurations are arranged for engagement of the upstream and downstream members when proper rotational tension is gathered in the spring. Most preferably, there are a plurality of corresponding nubs and slots—e.g., two nub-and-slot combinations spaced 180° apart.

In preferred embodiments, the spring is a coil spring housed within the vacuum sub-chamber and terminates in substantially axially-parallel end portions, and each of the spring-abutments includes a spring-retaining aperture receiving one of the end portions of the spring to facilitate development of appropriate rotational tension during assembly.

In certain preferred embodiments, the downstream member has an outlet port of a first cross-sectional area, and the bypass opening has a cross-sectional area at least equal to the cross-sectional area of the outlet port. When there are a pair of opposed bypass openings, such as in the radially-opposed positions of certain preferred embodiments, the combined area of the bypass openings preferably is at least equal to the area of the outlet port. This provides a bypass valve capable of rapid elimination of excessive suction forces when the bypass valve exceeds the normal bypass-operating vacuum pressures and automatically locks open.

Each of the bypass openings preferably has a narrowing configuration in a downstream direction such that progressively greater portions thereof will be exposed for bypass flow in response to stronger suction forces. This provides an automatic resetting range of bypass activation prior to any automatic locking of the bypass valve in the full bypass position.

In one highly preferred embodiment, the aforementioned downstream member includes at least one pre-scored cut line defining a region contiguous with the bypass opening. This facilitates enlargement of the bypass opening to suit specific operational needs. Such enlargement occurs by removal of such region from the downstream member.

Bypass valve 10 of the present invention is particularly well adapted for use in a liquid suction system connected to an automatic swimming pool cleaning head, though potential applications in liquid suction systems are very broad.

BRIEF DESCRIPTION OF THE DRAWINGS

The drawings illustrate preferred embodiments which include the above-noted characteristics and features of the invention. The invention will be readily understood from the descriptions and drawings. In the drawings:

FIG. 1a is top view of the bypass valve of the present invention in the closed configuration;

FIG. 1b is a side elevation cross-sectional view of the valve shown in FIG. 1a;

FIG. 2a is a top view of the valve in the bypass and locked position;

FIG. 2b is a side elevation cross-sectional view of the valve shown in FIG. 2a;

DETAILED DESCRIPTION OF PREFERRED EMBODIMENTS

Figure 3A:
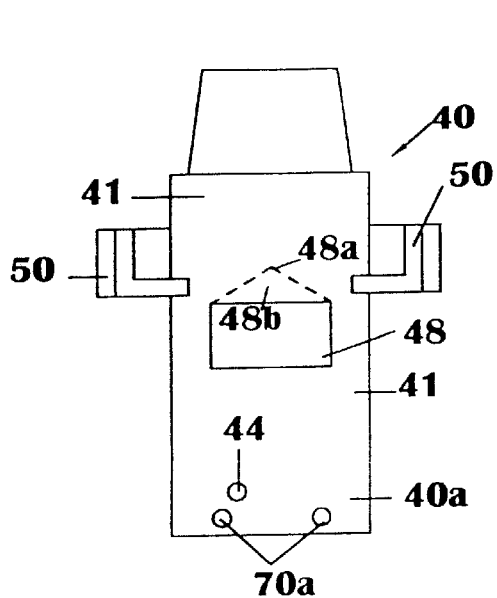
FIG. 3a is side elevation view of the downstream member of the present invention.

FIGS. 1b and 2b shows a bypass valve 10 which includes a valve body 12 defining a chamber 14 and having an outlet end structure 18 forming a first spring-abutment and first vacuum-reactive surface 18a, a guide channel (interior recess) 26, and a bypass-blocking wall 27. Bypass valve 10 further includes an inner assembly 11 in sliding engagement with the valve body 12 and forming an axial passageway 70 therethrough with an inlet port 30 and outlet port 42. Inner assembly 11 includes a downstream (base) member 40 fixed to an upstream (piston) member 28.

Figure 4A:
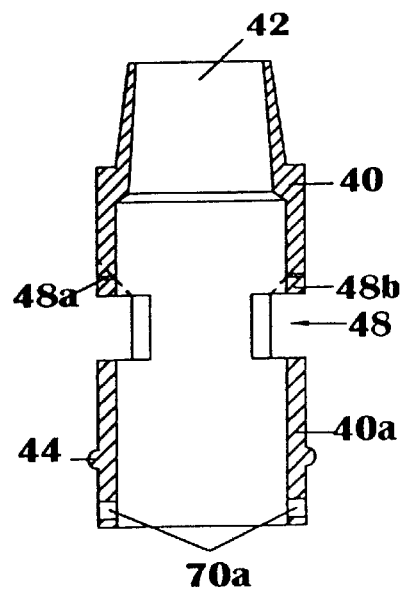
FIG. 4a is a side elevation cross-sectional view of the downstream member shown in FIG. 3a rotated on its longitudinal axis 90 degrees.
Figure 3B:
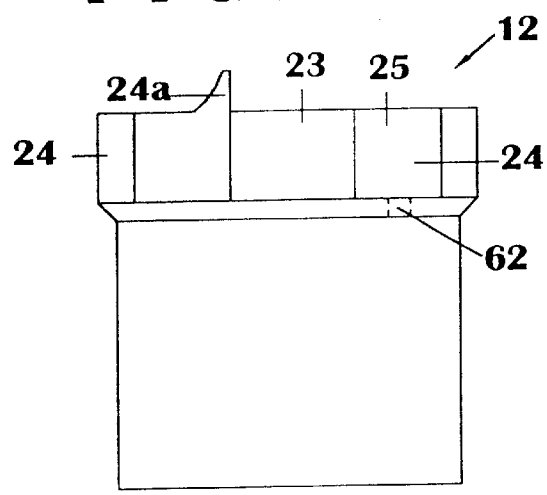
FIG. 3b is a side elevation view of the valve body of the present invention.
Figure 4B:
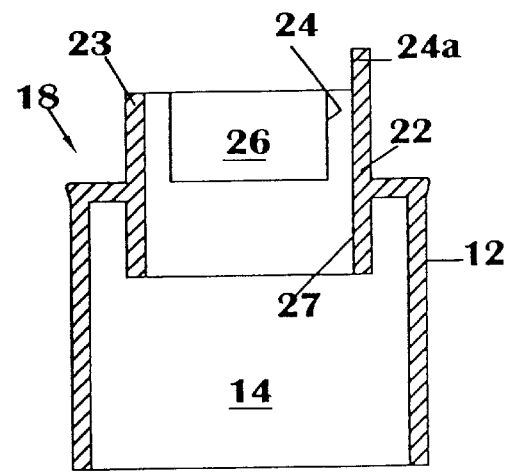
FIG. 4b is a side elevation cross-sectional view of the valve body shown in FIG. 3b rotated on its longitudinal axis 90 degrees.
Figure 3C:
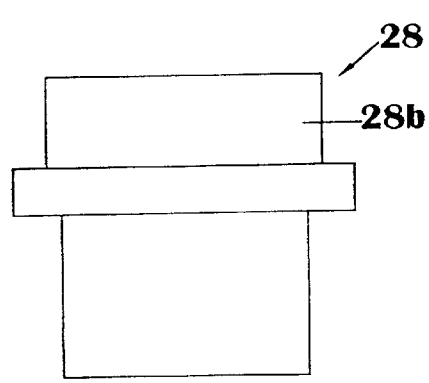
FIG. 3c is a side elevation view of the upstream member of the present invention.
Figure 5A:
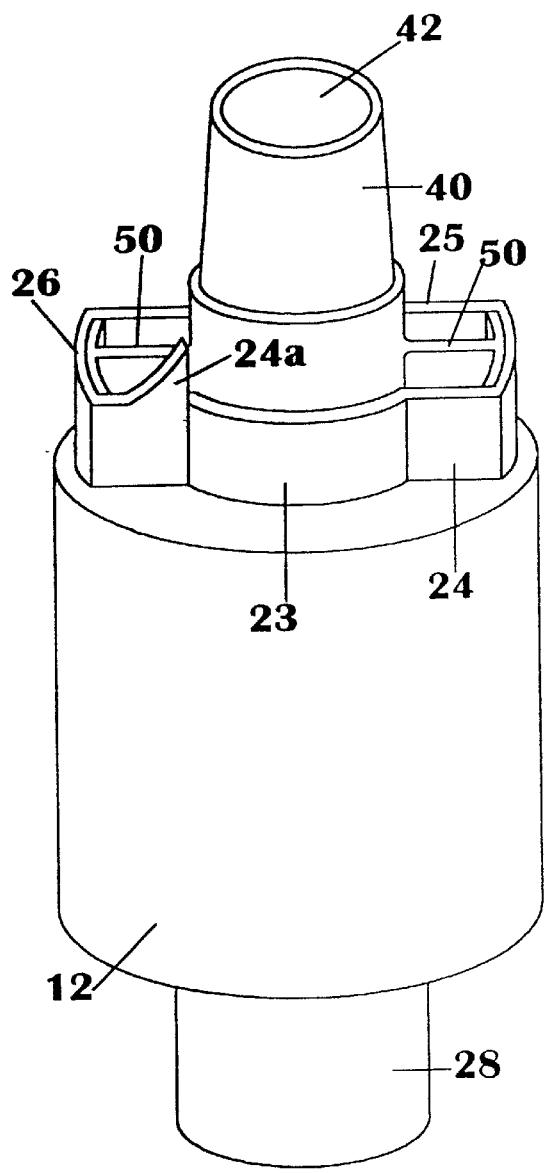
FIG. 5a is a perspective view of the valve in the closed position.
Figure 5B:
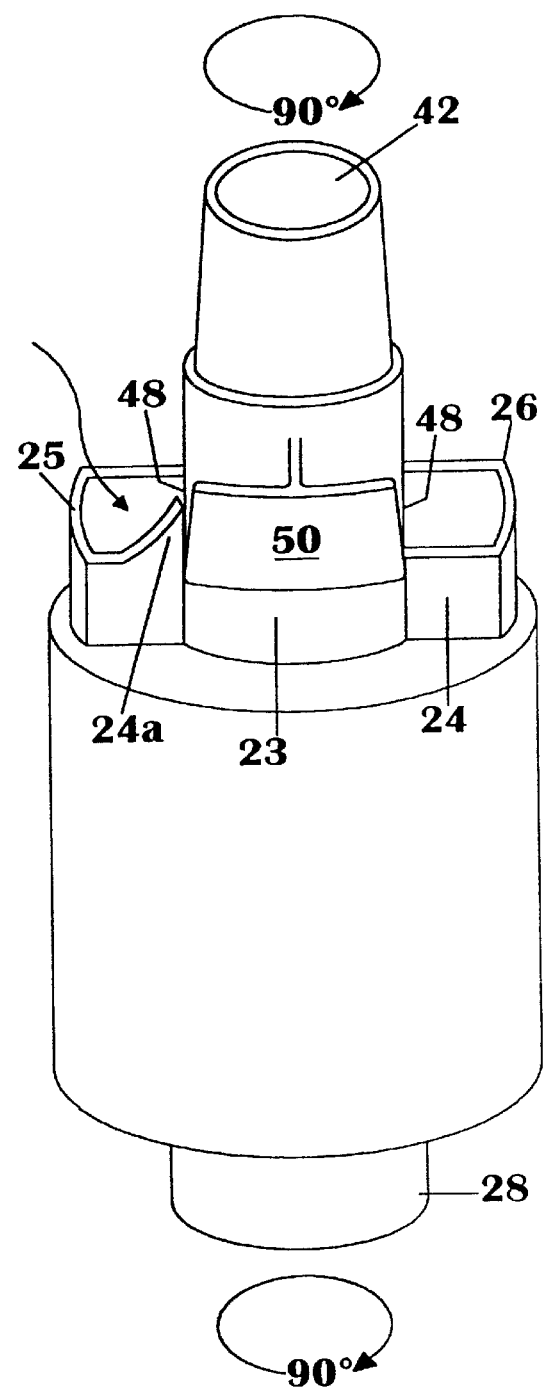
FIG. 5b is a perspective view of the valve in the bypass and locked position.

As best seen in FIG. 4b, outlet end structure 18 terminates axially inwardly in a sleeve 22 having an inward cylindrical sleeve wall 23 which forms bypass-blocking wall 27. As best seen in FIGS. 5a–b, outlet end structure 18 forms at least one radially-extending guide channel 26, guide channel 26 bounded by a sidewall 24 joining sleeve wall 23 and terminating in a downstream edge 25.

As best seen in FIGS. 1b, 3a and 4b, downstream member 40 includes a cylindrical tube portion 41 received in mating fashion within sleeve 22, tube portion 41 forming part of axial passageway 70 and defining a bypass opening (window) 48. The exterior dimensions of tube portion 41 are such that it slides freely along and in approximation to sleeve 22 while maintaining close clearances to prevent fluid leakage and vacuum suction loss.

Tube portion 41 of downstream member 40 and valve body 12 are substantially concentric and form an annular sub-chamber 14a therebetween terminating upstream at first vacuum-reactive surface 18a and downstream at second vacuum-reactive surface 28a. Sub-chamber 14a is in fluid communication with the axial passageway 70 through apertures 70a. Preferably the cross sectional area of first vacuum-reactive surface 18a is equal to the cross sectional area of the inlet port 30.

Downstream member 40 also includes guide-follower arms 50 extending radially from tube portion 41 into guide channels 26. Guide-follower arms 50 are slidably engaged with guide channels 26 in one rotational alignment with the valve body 12 in a normal operating range of axial positions with respect thereto and out of sliding engagement with guide channel 26 beyond such normal operating range. Guide-follower arms 50 fit snugly into the guide channels 26 when bypass valve 10 is in the closed position so as to prevent fluid leakage and vacuum suction loss.

Bypass valve 10 also includes a spring 60 in axial compression and rotational tension between first and second spring-abutments and compressible by vacuum force on first and second vacuum-reactive surfaces (18a and 28a respectively) to axially move the valve body 12 with respect to the inner member 11 whereby the spring 60 rotates the valve body 12 into a locked bypass position when guide channel 26 and guide-follower arm 50 are out of sliding engagement.

Figure 4C:
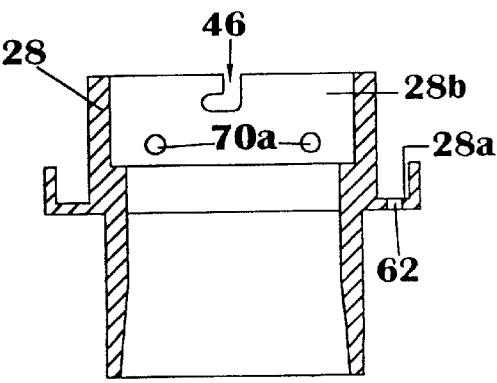
FIG. 4c is a side elevation cross-sectional view of the upstream member shown in FIG. 3c rotated on its longitudinal axis 90 degrees.

As best seen in FIG. 4c, upstream member 28 has a cylindrical downstream end portion 28b sized for mating engagement with the upstream end portion 40a of downstream member 40 (FIGS. 3a and 4a). In a preferred embodiment, upstream end portion 40a and downstream end portion 28b have a plurality of interacting slots 46 and nubs 44 for detachable locking engagement of the upstream member 28 and downstream member 40. The torsion force of spring 60 will keep nub 44 firmly positioned in locking slot 46. Alternatively, upstream member 28 and downstream member 40 may be detachably fastened by other means or permanently fastened with suitable adhesive or the like. When upstream member 28 and downstream member 40 are so coupled, the interior passageways of the respective members define a continuous interior passageway 70 through bypass valve 10.

Upstream member 28 has a second spring-abutment and a second vacuum-reactive surface 28a facing the first spring-abutment and vacuum-reactive surface 18a in the vacuum sub-chamber 14a. The exterior circumferential surface of second vacuum-reactive surface 28a has dimensions that enable the upstream member 28 to slide along and in approximation to the interior wall of chamber 14 of valve body 12 with close clearances so as to prevent fluid leakage and vacuum suction loss.

As best seen in FIGS. 3b, 4b, 5a and 5b, outlet end structure 18 includes a stop 24a engageable by guide-follower arm 50 to lint rotation of valve body 12 when guide-follower arms 50 are out of sliding engagement with guide channels 26.

As best seen in FIGS. 1b and 2b, spring 60 is a coil spring terminating in substantially axially-parallel end portions received in spring-retaining apertures 62 located in spring-abutments 18a and 28a to facilitate development of rotational tension during assembly of bypass valve 10. Alternatively, spring 60 may be secured with respect to valve body 12 and upstream member 28 by a spring-abutment block or a tab with a hole to receive the ends of spring 60 or by other means. Spring 60 is configured and connected at its ends such that the coupling between downstream member 40 and upstream member 28 requires rotation of a fixed amount.

FIG. 2b shows a highly preferred embodiment wherein bypass opening 48 of bypass valve 10 has narrowing configuration in a downstream direction such that progressively greater portions thereof will be exposed for bypass flow in response to stronger suction forces.

FIGS. 3a and 4a illustrate a certain highly preferred embodiment wherein tube portion 41 of downstream member 40 includes at least one pre-scored cut line 48a defining a region 48b contiguous with bypass opening 48 whereby bypass opening 48 may be enlarged by removal of region 48b. Whether or not regions 48b defined by pre-scored cut lines 48a are removed, the bypass opening(s) 48 define a cross sectional area greater than the cross sectional area at inlet port 30. When region 48b is removed, the downstream portion of bypass opening 48 may emerge from over the top of guide 26 before bypass valve 10 reaches the bypass/locked configuration. This provides a range of bypass-operating vacuum pressures without locking. If the cause of the pressure build up is removed, bypass valve 10 may return to the closed configuration; but if the obstruction remains, the pressure differential will continue to build until bypass valve 10 snaps into a fully bypassed and locked configuration. As may be readily surmised, when bypass valve 10 is triggered to move into the bypass configuration, any danger to persons or property caused by strong suction force at the inlet port is quickly eliminated.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed is:

1. An automatically-locking bypass valve for use in liquid suction systems, comprising:

a valve body defining a chamber and having an outlet end structure forming a first spring-abutment, a guide, and a bypass-blocking wall, the valve body having a first vacuum-reactive surface in the chamber;

an inner assembly in sliding engagement with the valve body and forming an axial passageway therethrough, the inner assembly including:

an upstream member having a second spring-abutment facing the first spring-abutment and a second vacuum-reactive surface in the chamber and opposed to the first vacuum-reactive surface, and a downstream member fixed to the upstream member and having a bypass opening and a guide-follower which is (a) slidably engaged with the guide in one rotational alignment with the valve body in a normal operating range of axial positions with respect thereto and (b) out of sliding engagement with the guide beyond such normal operating range; and a spring in axial compression and rotational tension between the first and second spring-abutments and compressible by vacuum force on the vacuum-reactive surfaces to axially move the valve body with respect to the inner assembly, whereby the spring rotates the valve body relative to the inner assembly into a locked bypass position when the guide and guide-follower are out of sliding engagement.

2. The automatically-locking bypass valve of claim 1 wherein:
   the spring is a coil spring terminating in substantially axially-parallel end portions; and
   each of the spring-abutments includes a spring-retaining aperture receiving one of the end portions of the spring, thereby facilitating the rotational tension developed in assembly of the valve.

3. The automatically-locking bypass valve of claim 1 wherein the first and second vacuum-reactive surfaces form the spring-abutments.

4. The automatically-locking bypass valve of claim 1 wherein:
   the outlet end structure (a) terminates axially inwardly in a sleeve haveing an inward cylindrical sleeve wall which forms the bypass-blocking wall, and (b) forms at least one radially-extending guide channel, the guide channel bounded by a sidewall joining the sleeve wall and terminating in a downstream edge; and
   the downstream member includes (c) a cylindrical tube portion received in mating fashion within the sleeve, the tube portion forming part of the axial passageway and defining the bypass opening, and (d) a guide-follower arm extending radially from the tube portion into the guide channel.

5. The automatically-locking bypass valve of claim 4 including a pair of the guide-follower arms extending in radially-opposite directions and a pair of the guide channels each receiving one of the guide-follower arms.

6. The automatically-locking bypass valve of claim 4 wherein the outlet end structure includes a stop engageable by the guide-follower arm to limit rotation of the valve body relative to the inner assembly when the guide-follower arm is out of sliding engagement with the guide channel.

7. The automatically-locking bypass valve of claim 6 wherein the stop is an axially-extending portion of the guide-channel sidewall.

8. The automatically-locking bypass valve of claim 4 wherein:
   the tube portion of the downstream member and the valve body are substantially concentric and form an annular sub-chamber therebetween terminating upstream and downstream in the vacuum-reactive surfaces, the sub-chamber being in fluid communication with the axial passageway;
   the tube portion has an upstream end portion;
   the upstream member has a cylindrical downstream end portion sized for mating engagement with the upstream end portion; and
   the upstream and downstream end portions having slot-and-nub configurations for detachable locking engagement of the upstream and downstream members.

9. The automatically-locking bypass valve of claim 8 wherein the slot-and-nub configurations are arranged for engagement of the upstream and downstream members when proper rotational tension is gathered in the spring.

10. The automatically-locking bypass valve of claim 9 including an equal plurality of nubs and slots.

11. The automatically-locking bypass valve of claim 1 wherein:
   the downstream member has an outlet port of first cross-sectional area; and
   the bypass opening has a cross-sectional area at least equal to the cross-sectional area of the outlet port.

12. The automatically-locking bypass valve of claim 1 including a pair of the bypass openings in radially-opposed positions.

13. The automatically-locking bypass valve of claim 1 wherein the bypass opening has narrowing configuration in a downstream direction such that progressively greater portions thereof will be exposed for bypass flow in response to stronger suction forces.

14. The automatically-locking bypass valve of claim 13 including a pair of the bypass openings in radially-opposed positions, each with the narrowing configuration.

15. The automatically-locking bypass valve of claim 14 wherein:
   the downstream member has an outlet port of first cross-sectional area; and
   the bypass openings have a combined cross-sectional area at least equal to the cross-sectional area of the outlet port.

16. The automatically-locking bypass valve of claim 1 wherein the downstream member includes at least one pre-scored cut line defining a region contiguous with the bypass opening whereby the bypass opening may be enlarged by removal of such region.

17. A bypass valve for use in liquid suction systems of the type including a valve body defining a chamber and a bypass-blocking wall, an inner member in sliding engagement with the valve body and having a bypass opening, the valve body and inner member having first and second opposed vacuum-reactive surfaces, and a spring between the valve body and the inner member against which the vacuum-reactive surfaces move axially with respect to each other, the improvement comprising:
   the valve body having a guide;
   the inner member having a guide-follower which is (a) slidably engaged with the guide in one rotational alignment with the valve body in a normal operating range of axial positions with respect thereto and (b) out of sliding engagement with the guide beyond such normal operating range; and
   the spring being in rotational tension whereby the spring rotates the valve body into a locked bypass position with respect to the inner member when the guide and guide-follower are out of sliding engagement.

18. The bypass valve of claim 17 wherein:
   the valve body forms a sleeve wall and has at least one radially-extending guide channel, the guide channel bounded by a sidewall joining the sleeve wall and terminating in a downstream edge; and
   the inner member includes a cylindrical tube portion received in mating fashion within the sleeve, the tube portion the bypass opening, and a guide-follower arm extending radially from the tube portion into the guide channel.

19. The bypass valve of claim 18 including a pair of the guide-follower arms extending in radially-opposite directions and a pair of the guide channels each receiving one of the guide-follower arms.

20. The bypass valve of claim 18 wherein the valve body has a stop engageable by the guide-follower arm to limit rotation of the valve body with respect to the inner member when the guide-follower arm is out of sliding engagement with the guide channel.

* * * * *